US010645490B2

(12) United States Patent
Anderson (10) Patent No.: US 10,645,490 B2
(45) Date of Patent: *May 5, 2020

(54) NETWORK SYSTEM FOR RELIABLE RECEPTION OF WIRELESS AUDIO

(71) Applicant: Sound Devices LLC, Reedsburg, WI (US)

(72) Inventor: Matt Anderson, Madison, WI (US)

(73) Assignee: Sound Devices LLC, Reedsburg, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,978

(22) Filed: Feb. 1, 2019

(65) Prior Publication Data

US 2019/0166423 A1 May 30, 2019

Related U.S. Application Data

(63) Continuation-in-part of application No. 15/623,522, filed on Jun. 15, 2017, now Pat. No. 10,433,084.
(Continued)

(51) Int. Cl.
| H04B 3/00 | (2006.01) |
| H04R 3/00 | (2006.01) |
| H04B 17/309 | (2015.01) |
| H04L 29/06 | (2006.01) |
| G06F 3/16 | (2006.01) |
| G10L 19/00 | (2013.01) |

(52) U.S. Cl.
CPC ............... H04R 3/00 (2013.01); G06F 3/16 (2013.01); H04B 17/309 (2015.01); H04L 65/80 (2013.01); H04R 3/005 (2013.01); G10L 19/00 (2013.01); H04R 2420/07 (2013.01)

(58) Field of Classification Search
CPC ...... H04R 3/00; H04R 3/005; H04R 2420/07; H04B 17/309; G06F 3/16; H04L 65/80; G10L 19/00
USPC .................................................. 381/80, 122
See application file for complete search history.

(56) References Cited

U.S. PATENT DOCUMENTS 5,768,126 A * 6/1998 Frederick ............... H04H 60/04
369/4
9,071,913 B2 6/2015 Koch
(Continued)

OTHER PUBLICATIONS

International Search Report and Written Opinion in PCT Application PCT/US17/37599 dated Sep. 11, 2017.

Primary Examiner — Ammar T Hamid
(74) Attorney, Agent, or Firm — Andrus Intellectual Property Law (57) ABSTRACT

Methods and devices are provided for a wireless microphone network whereby robustness for reception of audio information transmitted by one or more wireless microphones is enhanced. The system incorporates a dual stage approach for collecting, transmitting and receiving audio information. In the first stage, audio information collected by one or more microphone modules is transmitted to a series of receiver base stations. In the second stage, information received at each base station is subsequently transmitted to a receiver hub that selects, blends and/or augments the information to produce a high quality representation for audio information that provides improved robustness and reliability with respect to the movement, physical placement or performance of each microphone module.

20 Claims, 5 Drawing Sheets

Related U.S. Application Data

(60) Provisional application No. 62/367,367, filed on Jul. 27, 2016.

(56) References Cited

U.S. PATENT DOCUMENTS

| | | | |
|---|---|---|---|
| 10,433,084 B2* | 10/2019 | Anderson | G10L 19/008 |
| 2006/0193466 A1 | 8/2006 | Rodman | |
| 2011/0039554 A1 | 2/2011 | Bims | |
| 2011/0211524 A1 | 9/2011 | Holmes et al. | |
| 2013/0311001 A1 | 12/2011 | Lindenbauer et al. | |
| 2012/0114025 A1 | 5/2012 | Gauthier | |
| 2014/0154968 A1 | 6/2014 | Root et al. | |
| 2014/0269951 A1 | 9/2014 | Babarskas et al. | |
| 2014/0334635 A1* | 11/2014 | Larsson | H04R 1/08 |
| | | | 381/77 |
| 2016/0038361 A1* | 2/2016 | Bhimavarapu | A61G 7/05 |
| | | | 5/600 |
| 2016/0155455 A1* | 6/2016 | Ojanpera | G10L 25/81 |
| | | | 381/56 |
| 2016/0241252 A1* | 8/2016 | Popovich | H03M 1/188 |
| 2017/0134988 A1* | 5/2017 | Liu | H04W 28/18 |
| 2017/0171361 A1 | 6/2017 | Green et al. | |

* cited by examiner

NETWORK SYSTEM FOR RELIABLE RECEPTION OF WIRELESS AUDIO

CROSS REFERENCE TO RELATED APPLICATIONS

This application is a continuation-in-part of U.S. application Ser. No. 15/623,522 filed Jun. 16, 2017, which claims the benefit of U.S. Provisional Application No. 62/367,367 filed Jul. 27, 2016.

BACKGROUND

Wireless microphones are commonly used in numerous recording, playback or broadcast environments, including concerts, live stage recording, theatre, education, conferences, television or radio. The microphone modules themselves are often configured as either handheld or as a smaller lavalier microphone unit that is connected with a transmitter pack. Audio information collected by the microphone module is transmitted to and received at a receiver base-station. The transmitter unit in the microphone module should be as lightweight as possible, while providing a sufficiently long lifetime of operation without the need for battery recharging or replacement while at the same time, providing as wide of a range as possible for the allowable physical location of the module. However, the strength of signal received by a base station is dependent on both the strength (power level) of the transmitted signal and location of the microphone module relative to the base station. Accordingly, it is desirable to create a wireless microphone system with an improved range of reception for a given transmission power level.

SUMMARY

The disclosed invention provides a means to improve the allowable physical range for the operation of a wireless microphone while maintaining limits on the power levels used for data transmission between a microphone module and two or more receiving base stations.

A microphone module may be worn or carried by a user or mounted with good proximity to a desired sound source such as a performer, talker, musical instrument or other acoustic source. In the case of a wireless microphone module, audio information may be wirelessly communicated to another location for storage (recording), playback or broadcast. The efficacy of such a system depends on reliable transmission of audio data. Tradeoffs in the design of a wireless microphone module include the size and weight of the battery, the transmitter output power level, useful battery life and bandwidth (or transmission data capacity) in order to maintain reliability of transmission over a sufficient range for the physical placement or movement of the microphone module. Extending the allowable range of microphone modules for a fixed or lower transmitter power level provides an opportunity for using both a lighter weight battery, reduced power consumption and/or using a lower power transmitter design and may even aid in helping make devices compliant with FCC or other government regulations.

According to the invention, each microphone module transmits collected audio information wirelessly through a first stage of the network to be received by two or more base stations at different physical locations. Depending on their locations, each of them will present a distinct level of electromagnetic coupling and noise level with respect to the current location for each transmitting microphone module. Therefore, at any given time, the available received signal strength (or signal to noise ratio) for each module will vary from one base station to another. Accordingly, depending on physical placement, one or more base stations will have an advantage in receiving transmitted audio data over the others. In some embodiments, each base station may individually determine a receive signal strength indicator (or RSSI) based on the strength of their respective receive signal strengths. This information may then be used in reconstructing the (transmitted) audio waveform. For example, the output audio waveform may be constructed by emphasizing audio segments corresponding to base stations reporting the highest RSSI's or estimated signal to noise levels. In the art, RSSI refers to a measurement of the power present in a received radio signal (that is modulated to reside in a channel frequency and bandwidth). If background noise levels are also either known or inferred based on other measurements, a signal-to-noise-ratio (or SNR in dB) can be estimated by subtracting the noise power level (measured in dBm) from the RSSI level (also assumed measured in dBm).

Within the context of the invention utilizing spatial redundancy, two or more base stations remain operative in attempting to continue receiving wireless information from a given microphone module at the same time. These receiving base stations then each relay all of the audio information (or conditioned data) they collect, sending it over a secondary stage of the network to be blended or combined at a receiver hub. An advantage of sending all receiver information is the ability to exploit other modes of redundancy to ensure reliable reception, as described later in this disclosure. In addition to providing opportunities to exploit spatial redundancy (resulting from distributed receiver locations), other aspects of this invention may also allow exploiting opportunities for temporal redundancy (resulting from transmitting audio data derived from different points in time). In yet further aspects of this invention, the receiver hub, may be able (since it receives all receiver data) to identify points in time where no valid data exists from any receiver base. In these cases, a third mode of redundancy based on the correlation statistics of the audio waveform itself may be exploited to synthesize missing portions of (corrupt) audio data via packet-loss-concealments algorithms (PLCAs). For example, ITU Recommendation G.711 appendix I specifies a well known PLCA that is effective for synthesizing periods of audio data loss spanning up to a few tens of milliseconds. Particularly, in cases where a high degree of correlation exists in the audio signal such during voiced periods, a PLCA may render a gap in audio data unnoticeable to listeners. It is expected that even with the benefits of a diversity receiver array, periods of corrupt audio may occur either due to glitches or intermittent interferences with the microphone. These may include moments when user bumps or knocks a microphone against a solid object, causing a sharp and audible "thump" in the resultant data, temporarily rendering any collected data as corrupt. In instances such as these, the microphone module may itself condition (or mute) audio data to signify time (sample) periods when detected audio is assumed corrupted.

The secondary stage of the network is preferably either wired or wireless Ethernet and each base station may process the audio information they receive preferably into a "Digital Audio through Ethernet" (DANTE) compatible format before transmitting it to the receiver hub. In the preferred embodiment, data packets are encoded based on the DANTE protocol (Layer 3 packets). Other protocols that do not rely on the Ethernet frame structure (Layer 1 protocols) that may also facilitate communication for the second stage of the network include: AES50, SuperMAC, Hyper- MAC, A-Net, AudioRail, RockNet or Hydra2. Furthermore other protocols relying on standard Ethernet packets (Layer 2) may include: AES51, AVB, Ethersound, REAC, Sound-Grid, or dSnake. Finally other audio over Ethernet protocols based on network layer packets (Layer 3) may include: UDP data packets, AES67, AVB, NetJack, RAVENNA, Livewire, Q-Lan or WheatNet-IP. Any of these can suffice for communication in the second stage of the communications network provided each base-station is equipped for the encoding and broadcast (or transmission) of data and the receiver hub 105 is equipped for the decoding and reception of incoming audio data. The receiver hub collects and analyzes information received from each base stations to construct the best possible representation of information (audio waveform) originally detected and sent by the microphone module. The resultant audio information or constructed waveform is supplies to one or more endpoints.

In some embodiments, operations performed by the receiver hub may include dynamically selecting information sent by the base station that has the lowest error rate in its decoded audio signal. In other embodiments, it may select decoded information received by the base station reporting the highest signal strength from the microphone module. Other yet other embodiments, the decoded information from multiple base stations may be blended together with decoded information from multiple base stations to produce a decoded signal that is higher quality than what would otherwise be possible from information received from a single base station. Based on this, the receiver hub reconstructs and outputs a waveform or data representing of the original audio signal.

This resultant output from the receiver station may then be recorded, broadcast, mixed with other audio sources and/or played back to listeners via headphone or loudspeaker arrangement. In some embodiments, the microphone modules themselves will encode audio waveform data for reduce bandwidth requirements. In these cases, the step of decoding the data for the actual audio waveform (audio PCM data) may be performed at either each base station, the receiver hub or at a later time if this data is to be recorded.

DETAILED DESCRIPTION

Figure 1:
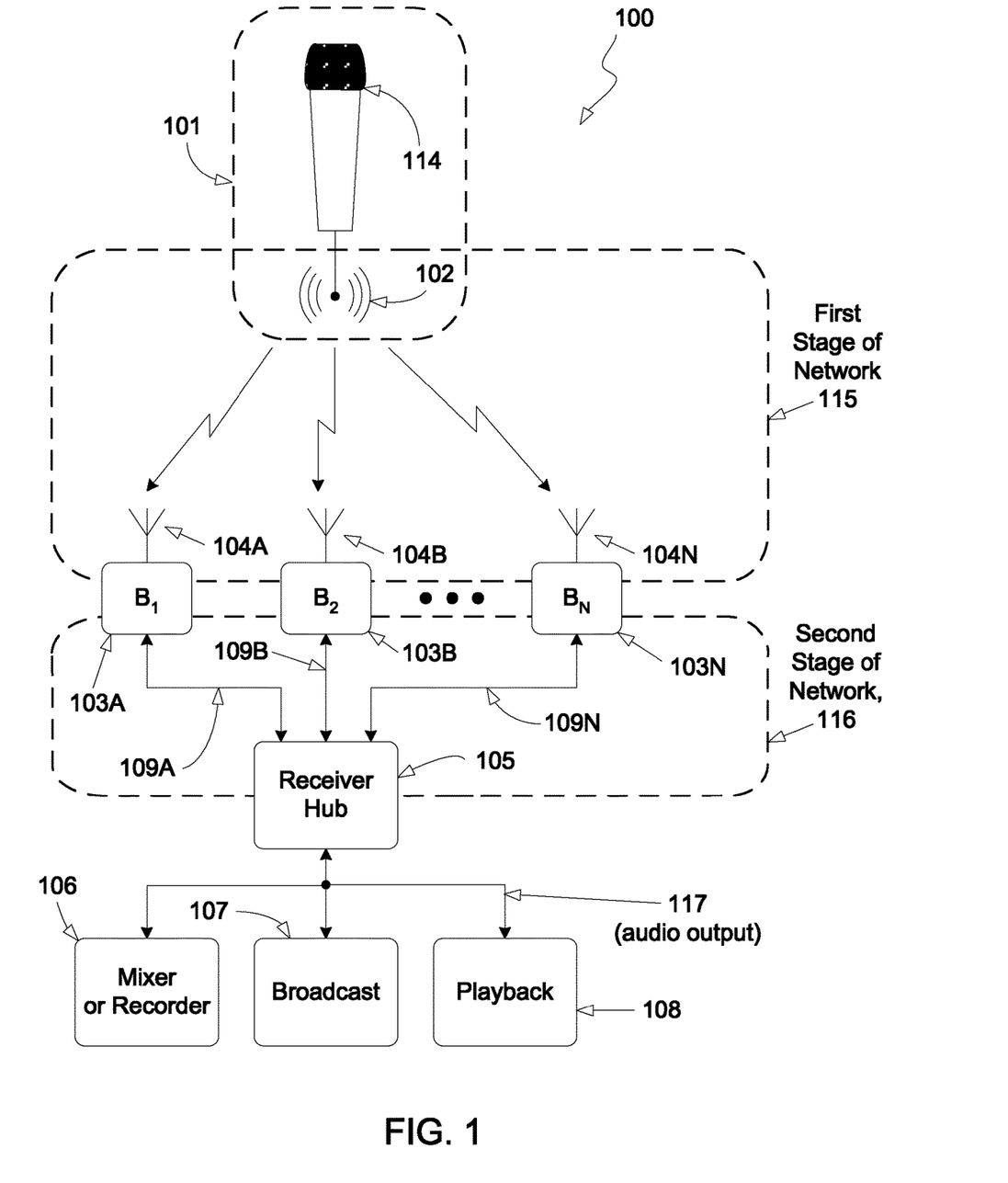
FIG. 1 is a simplified diagram for wireless microphone system with a two-stage network in accordance with a first exemplary embodiment of the present invention, where the secondary stage is based on a star topology.

FIG. 1 shows a system 100 constructed in accordance with an exemplary embodiment of the invention. In this disclosure, the term "audio waveform" refers to physical acoustic sound or vibration present at a given location that is desired to be captured via a wireless microphone. As shown in FIG. 1, a microphone module 101 includes at least one microphone element 114 for sensing an audio waveform and a microphone transmitter 102 that contains suitable electronics and an antenna to be capable of wirelessly transmitting information or data from the microphone module 101. Normally, the transmitted information would allow for characterization of or describing the audio waveform over time. For example, with a digital wireless microphone, the audio waveform may be converted to an electrical waveform and digitized using an analog to digital converter (ADC) at a given sample rate. Audio data representing the digital samples can be transmitted by the microphone transmitter 102. In some embodiments, data compression may be used for reducing the data rate required for transmission of the audio waveform. In the case of an analog wireless microphone, the audio waveform can be used as a basis for frequency modulating a carrier output from the microphone transmitter 102. The modulation used for transmitting wireless audio data from the microphone module 101 may rely on FM, phase-shift keying (PSK, BPSK, QPSK, etc.) or spread-spectrum techniques. Other elements not shown that may be part of the design for the microphone module 101 include a housing for structural support, various circuits, power supplies, batteries, adapters, clips, amplifiers, companders, limiters, signal conditioners or filters, analog to digital converters, memory, communications circuits, modulators, antennas, microprocessor, digital signal processors and/or software for configuration, control and operation of the microphone module 101 that will be apparent to one skilled in the art.

A series of base-stations placed in the general vicinity of the microphone module 101 can attempt to receive wireless audio data being transmitted by it. Each base station includes or is coupled with a base station receiver. Specifically, a first base-station 103A is coupled with a first base station receiver 104A, a second base station 103B is coupled with a second base station receiver 104B through an $N^{th}$ base-station 103N is coupled with an $N^{th}$ base station receiver 104N. Each base-station receiver includes an antenna and may be placed in the vicinity of the microphone transmitter 102 (or location where it is expected to be near at some point in time depending on the anticipated movement of the microphone module 101). Each base-station receiver (with its antenna and supporting electronics) attempts to detect the RF signal modulated by audio data, demodulate it and retrieve the original audio data that was transmitted from the microphone module 101 by its microphone transmitter 102. Each base station will also include the required internal electronics and/or software as needed to further process received audio data and transmit it from an attached communications link, as later described in this disclosure. In some embodiments, the base station and base-station may be integrated into the same package/unit. In other embodiments, the base station may be packaged separately from (although still connected to) its base-station receiver. Similarly, a microphone module 101 may be integrated with its transmitter 102 in the same package, or they may be packaged separately, (although still connected). While a total of N base-stations are indicated by the diagram, in some embodiments, only two base stations (N=2) or three (N=3) may be required. In general, the invention may be flexible in how many base-stations are used. In the art, wireless microphone systems that utilize multiple receiving base-stations are often referred to as "diversity wireless receivers" or are referred to as having "diversity reception". In the art, diversity reception may improve the reliability of reception based on redundancy in bandwidth—where multiple antennas are used simultaneously. In addition to dual antenna diversity, the invention includes modes utilizing spatial, correlation and/or temporal redundancy to improve reliability.

In FIG. 1, an electromagnetic coupling is drawn between each base station receiver, 104A, 104B through 104N, and the microphone transmitter 102. However, the ability for each base station to receive audio data from the microphone module 101 will in general depend on the position of the microphone transmitter 102 relative to the placement of each base station 104A receiver, 104B through 104N. For example, if the microphone transmitter 102 is placed closer to the first base station 104A receiver and further from second base station 104B receiver, the first base station receiver 104A may have an advantage in receiving a higher signal-to-noise ratio (SNR) at its antenna than for the second base station receiver 104B. Accordingly, in the case of a digital wireless transmission of audio data from the microphone transmitter 102, the first base station 103A may be able to accept a higher rate of data transmission and/or achieve a lower error rate in receiving audio data from the microphone module 101 than for the second base station 103B. In the case of an analog wireless transmission of audio data from the microphone transmitter 102, the first base station 103A may be able to provide a higher SNR for received audio data (waveform) than for the second base station 103B.

In contrast, if at a later time, the microphone transmitter 102 is moved to a position closer to the second base station receiver 104B than for the first base station receiver 104A, the second base station receiver 104B may have an advantage in receiving a higher signal-to-noise ratio (SNR) at its antenna than for the first base station receiver 104A. Accordingly, in the case of a digital wireless transmission of audio data from the microphone transmitter 102, the second base station 103B may be able to accept a higher rate of data transmission and/or achieve a lower error rate in receiving audio data from the microphone module 101 than for the first base station 103A. In the case of an analog wireless transmission of audio data from the microphone transmitter 102, the second base station 103B may be able to provide a higher SNR for received audio data (waveform) than for the first base station 103A.

In general, the SNR with respect to data transmitted by the microphone transmitter 102 will vary from one base station receiver to another. While the SNR will depend on the distance between each base station receiver and the microphone transmitter 102, it may also depend on electromagnetic interference caused by other objects or obstructions, the position, spectral content and strength of other electromagnetic noise/interference sources, and line of sight between the base-station receiver in question and the microphone transmitter 102. In some embodiments, the base-stations and their receivers themselves may not be identical. In these cases, the received SNR or transmission error rate may also depend on differences between the antenna and/or amplifiers or other electronics used within each base-station and its receiver.

In some embodiments, the location of the microphone transmitter 102 (and often, the microphone module 101 integrated with it) may be fixed. For example, it may be mounted on a microphone stand in front of a performer. In other embodiments, the microphone transmitter 102 may be moving. For example, it may be carried by a performer in a live theatre setting. In general, knowing which base-station receiver, 104A, 104B through 104N will provide the highest SNR or most reliable data communication link to the microphone transmitter 102 is generally very difficult to determine. This depends on a myriad of factors going beyond the simple location of either the microphone transmitter 102 or any of the base-station receivers, 104A, 104B through 104N. Furthermore, in many settings, the index (for example, indexing the first base-station 104A as "A", the second base-station 104B as "B" and so on to index the $N^{th}$ base-station 104N as "N") for the base station receiver provided the best reception may rapidly change over time as performers, theatre/stage equipment/props, microphone modules (and their transmitters), interference sources move about and in some cases, even the location of the base-stations and their receivers changes.

Additionally, the occurrence of errors in the reception of transmitted audio data are statistical in nature with the exact timing and number of error for digital transmission of audio data or details of noise induced for analog transmission of audio data impossible to predict with respect to each base-station. For example, even if the microphone transmitter 102 is much closer to the first base station receiver 104A and provides it with a higher SNR than for the second base station receiver 104B, there still may be instances or periods of time when digital transmission errors occur for reception of data at the first-base station 103A, while data is properly received by the second base-station 103B. As another example, if an interference source is placed much closer to the first base station receive 104A than for the second 104B, the SNR for reception at the first base station receiver 104A may be worse than for the second 104B, even if the second base station receive is farther from the microphone transmitter 102 and present a lower overall wireless signal level.

Previous approaches that assign one base-station receiver or the other to receive wireless audio data from the microphone transmitter 102 suffer from the fact that when errors or noise occur for the selected base-station, there may be others that could have otherwise provided the missing data, having properly received it or a lower noise level.

The invention overcomes the important problem of knowing which base-station is best suited for receiving audio data by having multiple (or in the preferred embodiment, all) base-stations continuously receive data from the microphone transmitter 102 and continuously forward this data to a receiver hub 105, that retains access to all available valid information over time.

As shown in FIG. 1, the first base station 104A is provided with a secondary communications link 109A to a receiver hub 105. Similarly, the second base-station 104B is provided with a secondary communications link 109B to a receiver hub 105. This continues for each additional base-station until the $N^{th}$ base-station 104N, being provided with a secondary communications link to the receiver hub 105.

As indicated in FIG. 1, the combination of the microphone transmitter 102, the collection of each path electromagnetically coupling it to each base-station and each base-station receiver can be considered as comprising the first stage 115 of a communications network. This is indicated by a dashed box surrounding these elements in FIG. 1.

In contrast, the combination of each communications link, 109A, 109B through 109N and receiver hub 105 can be considered as comprising a second stage of a communication network 116. This is again indicated by a dashed box surrounding these elements in FIG. 1.

Base stations 103A, 103B through 103N can be considered as bridging the two stages of the communications network, as they receive wireless audio data from their respective base-station receivers and re-transmit or broadcast this information over the communications links, 109A, 109B through 109N. The communications links 109A, 109B through 109N may be either wired or wireless and in the preferred embodiment, based on an Ethernet connection. In these cases, base stations 103A, 103B through 103N preferably further processes and reformat audio data received by their respective base-station receivers into a series of internet protocol (IP) packets (or layer 3 IP packets), where the data format is based on the "Digital Audio Network Through Ethernet" or DANTE protocol.

Upon receiving the audio data re-transmitted from each base-station, the receiver hub 105 may construct an output data stream representing the original audio data sent by the microphone module 101 by augmenting data segments selected from any base-station that is able to provide those portion on an error-free basis over time.

In some embodiments where data is digitally transmitted between a microphone module 101 and each base-station 103A, 103B through 103N, the microphone module may digitize the audio waveform received from the microphone element 114 and subsequently encode it the data for a reduced data rate. It may furthermore encode the data utilizing an error correcting code. In some embodiments, encryption may be additionally applied. For these embodiments, the receiver hub 105 may construct an error free output data stream by decoding (and when required, decrypting) the received data and augmenting data segments where error correction is possible. Otherwise, in cases where no segments exist that are either error-free or would allow for complete error correction, the receiver hub 105 may select segments for output data stream construction that have the lowest error rate. In cases where error correction is not used but the data transmission format allows for error detection, the receiver hub 105 may construct the output data stream by augmenting data segments selected to have the lowest number of detected errors.

In some embodiments, analog data transmission occurs between the microphone module 101 and each base-station 103A, 103B through 103N. For example, the transmitter 102 of the microphone module 101 may transmit an audio signal based on an analog wideband FM transmission over a bandwidth of approximately 200 kHz over the first stage 115 of the network. In these cases, each base station may digitize, encode and forward the received signals with any noise artifacts over the second stage of the network 116 to the receiver hub 105. The receiver hub 105 may then reconstruct a reduced noise or noise-free output based on the combination of received data streams. For example it may simply emphasize the signal corresponding to the base-station reporting the highest signal level. In some embodiments, it may blend the audio data on a basis of the signal strength reported from each base-station. For example, if two base stations are both receiving an analog signal based on a signal strength that is similar between them, the receiver hub 105 may construct an output based on an average between the multiple received audio signals commonly spanning a given time interval. In some embodiments, the output may be formed based on a weighted sum of the audio waveform received from each base station where the weighting is dependent on the signal levels, SNR or receiver error rate detected at each base station. Finally, embodiments are envisioned where if several base stations detect a good signal level, the output may be formed on a basis of outlier rejection. For example, if at a point in time, the waveforms from three of the base stations are reported as 0.5, 0.51 and 0.49, while a fourth base station reports an audio waveform having a value of 1.5, this value would be rejected as being an outlier. Other useful functions may be included that are based weighted sums (on a basis of SNR or RSSI) or median filters applied to the array of received signal segments received (or collected) from the set of base stations. In order to facilitate the rejection of faulty data, each receiver hub may condition its data based on estimated SNR or quality of reception. For example, if a section of data is known to be unreliable at a base station, data received by this base station may be conditioned to signify a low expectation of reliability, such as muting or zeroing out corrupt audio data. If this audio data is later reconstructed at the receiver hub, based on weighted sums, the zero data will have not corrupt a weighted sum or average. Alternatively, a base station may identify unreliable data by setting values to a predetermined pattern, such as alternating +/− full scale so that a receiver hub can easily identify and omit this data from reconstruction based on outlier rejection methods.

The output from the receiver hub 105 may consist of either an analog audio output, digital audio PCM, compressed digital audio or other data stream representing the reconstructed audio signal. It is provided as an input to one or more end-points. Examples of end-points shown in the system 100 of FIG. 1 include a mixer/recorder 106, a broadcast network 107 or a playback device 108. Other types of end-points can include virtually any device or system that could benefit from access to the output data stream and are envisioned within the scope of this disclosure.

Figure 3:
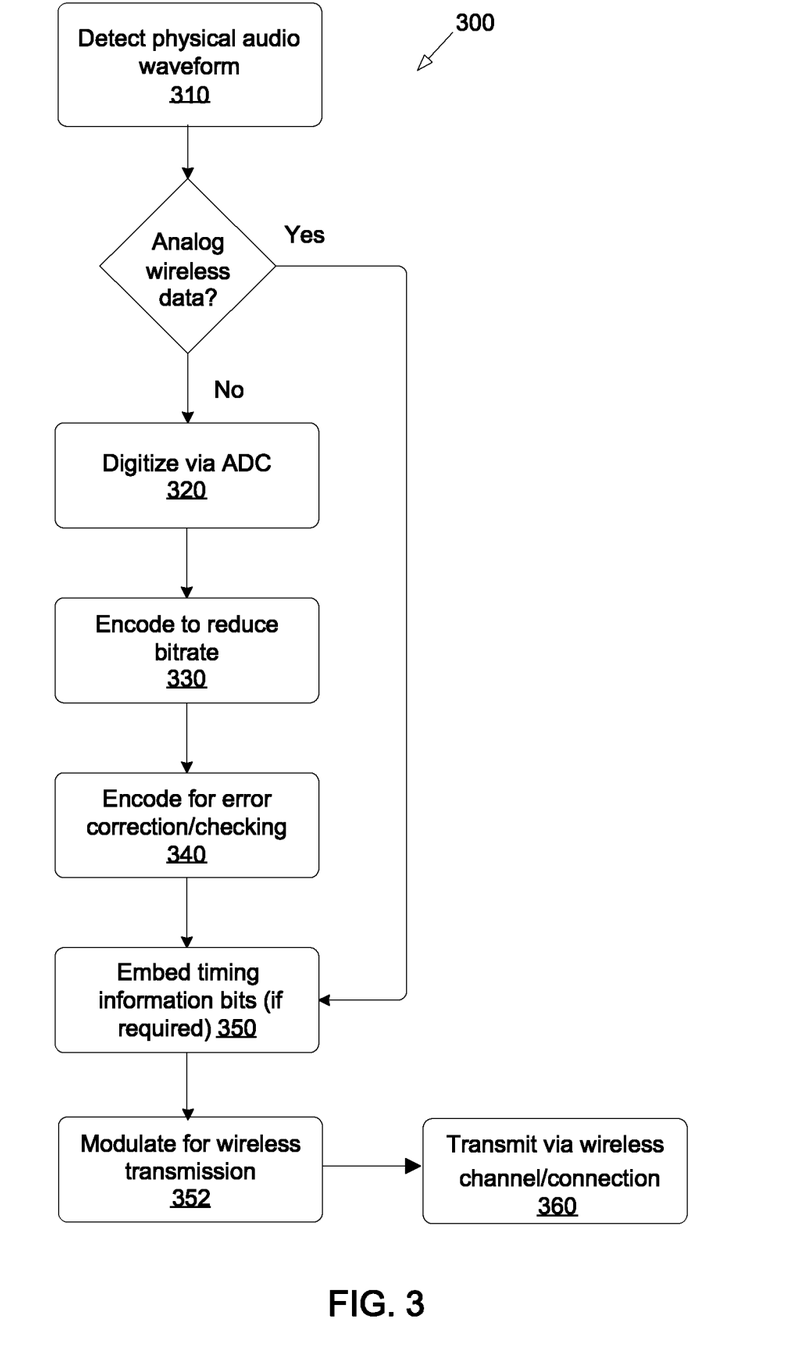
FIG. 3 is a block diagram showing select steps that may be taken by a digital microphone module in transmitting audio data according to an exemplary embodiment.

FIG. 3 illustrate a simplified block diagram showing select steps that may be taken by a digital microphone module in detecting a physical waveform and transmitting corresponding audio data across the first stage 115 of the network according to an exemplary embodiment.

At step 310, method 300 includes using a microphone element 114 for detecting a physical sound waveform and converting it to an analog electrical waveform. Other operations that may be included in this step include filtering and amplifying this signal and in the case of an analog wireless transmission, optionally companding or limiting. In the case of analog wireless transmission, the process proceeds to step 350. At this step, additional information may be embedded with each audio segment to indicate the chronology, timing and/or order of each segment. This information may take the form of a time-stamp or chronological numbering where sequential binary numbers are assigned to each segment as they are processed. Examples of timecodes include SMTPE or linear time code (LTC) or may be included as part of the DANTE protocol. These may be generated internally or externally supplied for synchronizing between audio segments. As another example of time stamps, a timer value may indicate absolute time-alignment with respect to the start of a recording. In this case, a sample-period counter/timer may also be used to indicate an absolute or relative sample-period index for specific sample (such as the first or last one) in the segment to be subsequently used for the time-alignment of each segment. It should be recognized that in some embodiments where exceptionally low latencies exist (operating in real-time), the application of timing information may be unnecessary, where the timing of audio segments is inferred based on the time (and the order) that they are received. Otherwise, in the case of digital wireless transmission, the process proceeds to step 320. At this step, the analog electrical waveform is processed by an analog to digital converter (ADC). Additional operations that may be included in this step include digitally filtering or limiting the digitized audio signal. The process then continues to optional step 330. At this step, a software algorithm is applied to reduce the required bit rate for transmission of the digital audio data. Typically, a low-latency data compression algorithm is preferred having less than a few milliseconds of delay. The process continues to the next optional step 340 where depending on the desired data transmission rate, error correcting codes may be applied to the bit-stream to improve the robustness to wireless transmission errors. In other cases, redundant bits may be added to allow for error checking. Either error correcting codes or error checking will increase the required transmission data rate, depending on the complexity of the algorithm. Next, timing or sequence data is embedded if necessary as discussed previously with respect to block 350. The process proceeds to step 352 where the digital data stream is converted into a modulated waveform suitable for RF transmission with timing information, as needed. The type of modulation may include FM, FSK, PSK, QPSK or other modulation techniques may be suitable. Other operations may include signal conditioning, filtering and amplification of the signal. The process then proceeds to step 360 where the modulated waveform is converted into an electromagnetic signal transmitted from the microphone module transmitter, 102.

Figure 4:
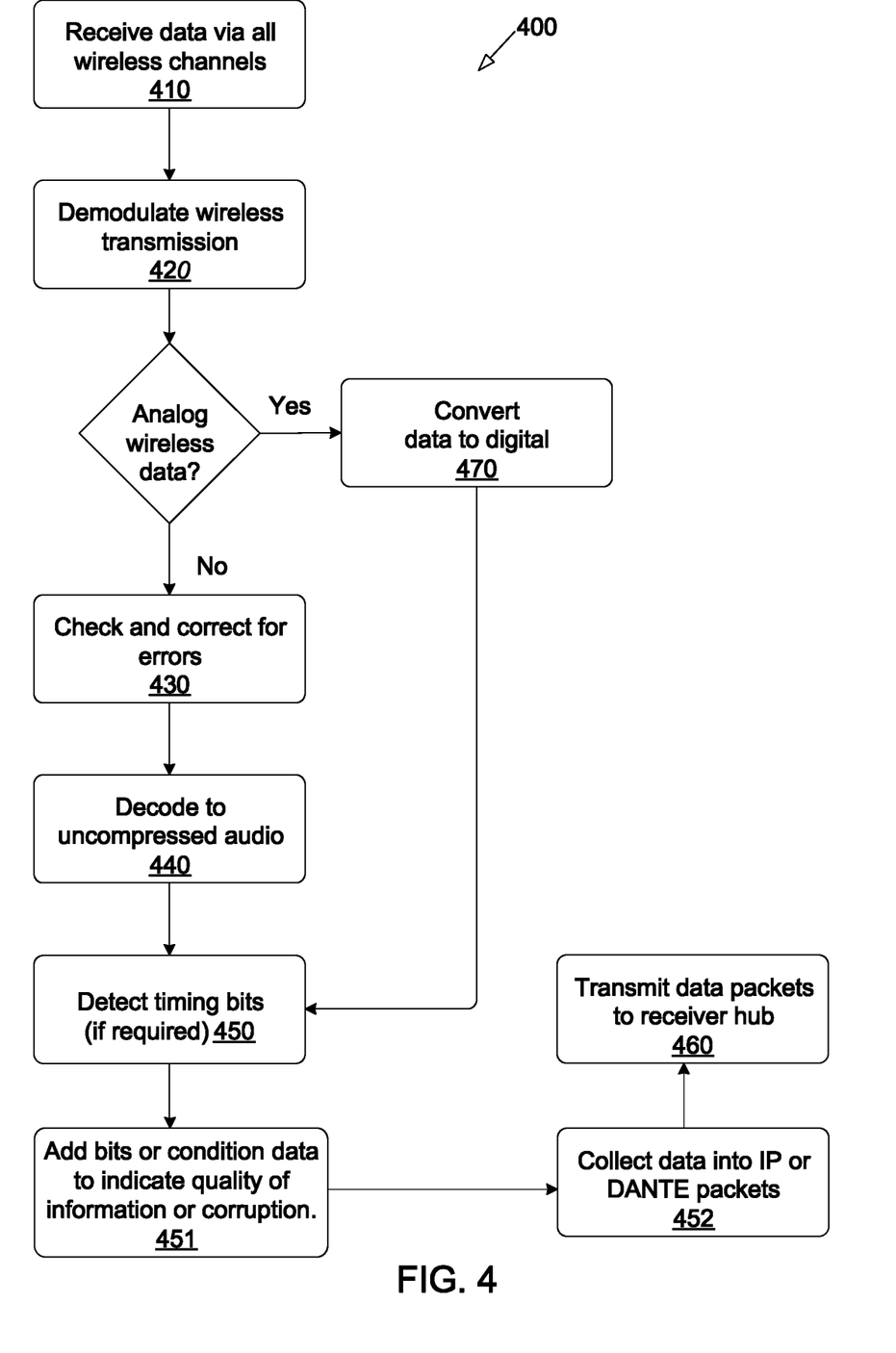
FIG. 4 is a block diagram showing select steps that may be taken for a base station receiving, audio data from the microphone module, processing that data and forwarding it to a receiver hub according to an exemplary embodiment.

FIG. 4 illustrate a simplified block diagram showing select steps that may be taken by a base station in receiving audio data that is wirelessly transmitted across the first stage 115 of the network, processing, reformatting and if required, timing and conditioning the received data for transmission over the second stage 116 of the network according to an exemplary embodiment.

At step 410, method 400 includes the base station receiver detecting the electromagnetic signal for any active channels (with each channel associated with a microphone module). Additional operations that may be included in step 410 are amplifying, filtering and conditioning the received signals. The process proceeds to step 420 where the received data is demodulated. If the wireless data is analog, the process proceeds to step 470 where the analog audio signal is converted through an ADC to a digital signal. Additional filtering and/or signal conditioning may be applied here. The process then proceeds to step 450 where timing information is extracted if it has been embedded with audio segments. Otherwise in the case of digital wireless audio being transmitted, the process proceeds to step 430. If step 340 was not included in method 300 for the microphone module 100, the process proceeds to step 440. Otherwise, the demodulated data is checked for errors and/or the presence of errors is detected. At this point, information may be gathered regarding the quality of signal (such as RSSI, SNR and/or error rate data) and such information may be included in audio data subsequently forwarded to the receiver hub 105. Upon reaching step 440, if step 330 was not included in method 300, the process forwards to step 450. Otherwise, the data may be optionally decompressed, extracting the original (PCM) raw digital data that was produced by step 320 of method 300. At step 450, timing information may be detected and the process proceeds to step 451, where quality of information (such as RSSI or SNR) may be added into the data. Other functions at step 451 may include muting data samples or setting them to an identifiable pattern for sections of the audio waveform where data samples are known to be corrupt. Upon reaching step 452, data is encoded into packets based on the DANTE protocol (Layer 3 packets), or another audio over Ethernet protocol. Other data packets may be created that also contain information reported regarding the number and location of error detected, wireless signal levels, noise levels and any other information the base stations can provided that may prove useful to the receiving hub 105. The process then proceeds to step 460 where the data packets are transmitted (or broadcast) over the second stage 116 of the network.

Figure 5:
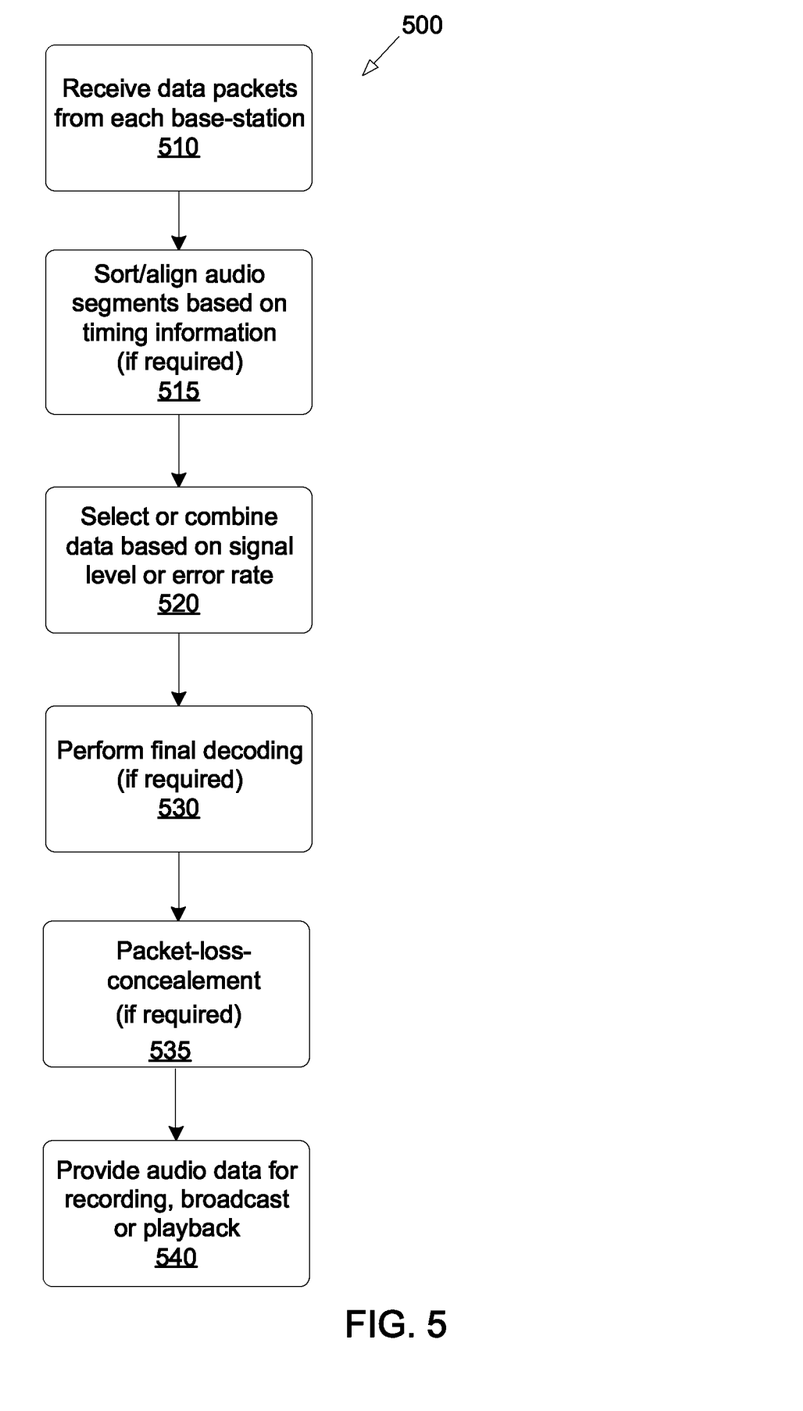
FIG. 5 is a block diagram showing select steps that may be taken for receiving, audio data from each base station by a receiver hub and processing that data before forwarding it to be recorded, broadcast or played back according to an exemplary embodiment.

FIG. 5 is a block diagram showing select steps that may be taken for receiving, audio data from each base station by a receiver hub and processing that data before forwarding it to an end-point according to an exemplary embodiment. It should be understood that multiple modalities exist for the reconstruction of audio data within the receiver hub: For example, as a first modality, reconstruction may be based on sample selection, wherein data samples are repeatedly constructed on a sample to sample basis emphasizing data received by receiver base stations that are deemed as being the most reliable at the time of reception. As a second modality, each receiver base station may further process its own received data such that unreliable data will later have a minimal impact on reconstruction. For example, at times when data reception is deemed as unreliable, it may simply mute corresponding audio data or set it to values known to signify unreliable data, such as full-scale values that would be omitted by outlier rejection protocols. As an example of a third modality, redundancy in time may be used. In this case, the microphone module stores data from previous time periods in memory and retransmits data from the previous time periods in the same or different stream as the live data so that the retransmitted data can be used in case the data was not reliably received when it was first transmitted. For example, the microphone module 201 may transmit the most recently received data in real time as well as data received after being passed through a delay buffer (such as preferably less than a 100 ms in length or more preferably less than 30 ms). Since it is preferred that the receiver hub continually receive all data transmitted by each receiver base station, it may still reconstruct sections of missing audio if time periods are detected where receipt of all receiver data has been flagged as unreliable. While it is preferred that all the data be transmitted to the receiver hub in this modality, it is possible for the receiving base stations be used to determine whether it is necessary to use the retransmitted audio data and/or used to substitute the retransmitted data.

At step 510 of method 500, the receiving station 105 receives data packets, preferably compatible with the DANTE protocol and retrieves audio data and other information relating to signals, errors, error rates, noise or any other information forwarded by the base stations. Proceeding to step 515, timing information relating to audio segments is retrieved. Regardless of whether or not timing information such as time-stamps has been included with audio segments, the relative timing between received segments of audio waveform data may be inferred by computing the cross-correlation between waveform segments and detecting a peak in the cross-correlation function to indicate an alignment offset between the two segments. The lag corresponding to this peak may correspond to the timing difference between them and subsequently be used to align them prior to combining them at step 520. The process proceeds to step 520. At this step, for each channel of audio, where each microphone module 101 will be assigned to a distinct channel, audio data is combined, selected and/or augmented as described above in connection with the various modalities of reconstruction, in order to produce the most robust, the highest resolution and/or lowest noise level for each resultant audio output data stream. Once reconstruction has occurred, the process then proceeds to step 530. In many cases this step may be skipped. However, in some embodiments, the receiver hub 105 may operate on data before it is fully decoded. For example, data may be encoded using a low delay audio compression technique (for example, the aptX Live audio codec, low-delay AAC, Siren, etc.) for reducing bandwidth requirements of the wireless transmission. In some cases where digital transmission is used, it may be desirable to blend selections from within data segments to produce a error-free (or reduced error) segments before attempting to decompress the audio signal. At step 535, missing or corrupt data may be repaired (if required) via synthesis through a packet-loss-concealment algorithm. These types of algorithms may be used to synthesize missing portions of audio data as described above. The process proceeds to step 540 where the resultant output data stream is provided, sent or broadcast to one or more end-points.

FIGS. 3-5 illustrate methods according to example embodiments. Although specific orders of steps are suggested among these figures, these are by no means the only order that may prove suitable for the embodiments disclosed here. For example, in many cases, two or more steps may be performed concurrently or with partial concurrence and/or in reverse order or omitted. Furthermore, many additional steps are implied, although not shown, to achieve the functions described here and as being evident to one skilled in the art, are considered part of this disclosure. Many variations may depend on the software and/or hardware systems chosen for a specific embodiment. Upon reading this disclosure, these variations will become evident to one skilled in the art and are to be considered as suggested and envisioned within the scope of the disclosure.

Figure 2:
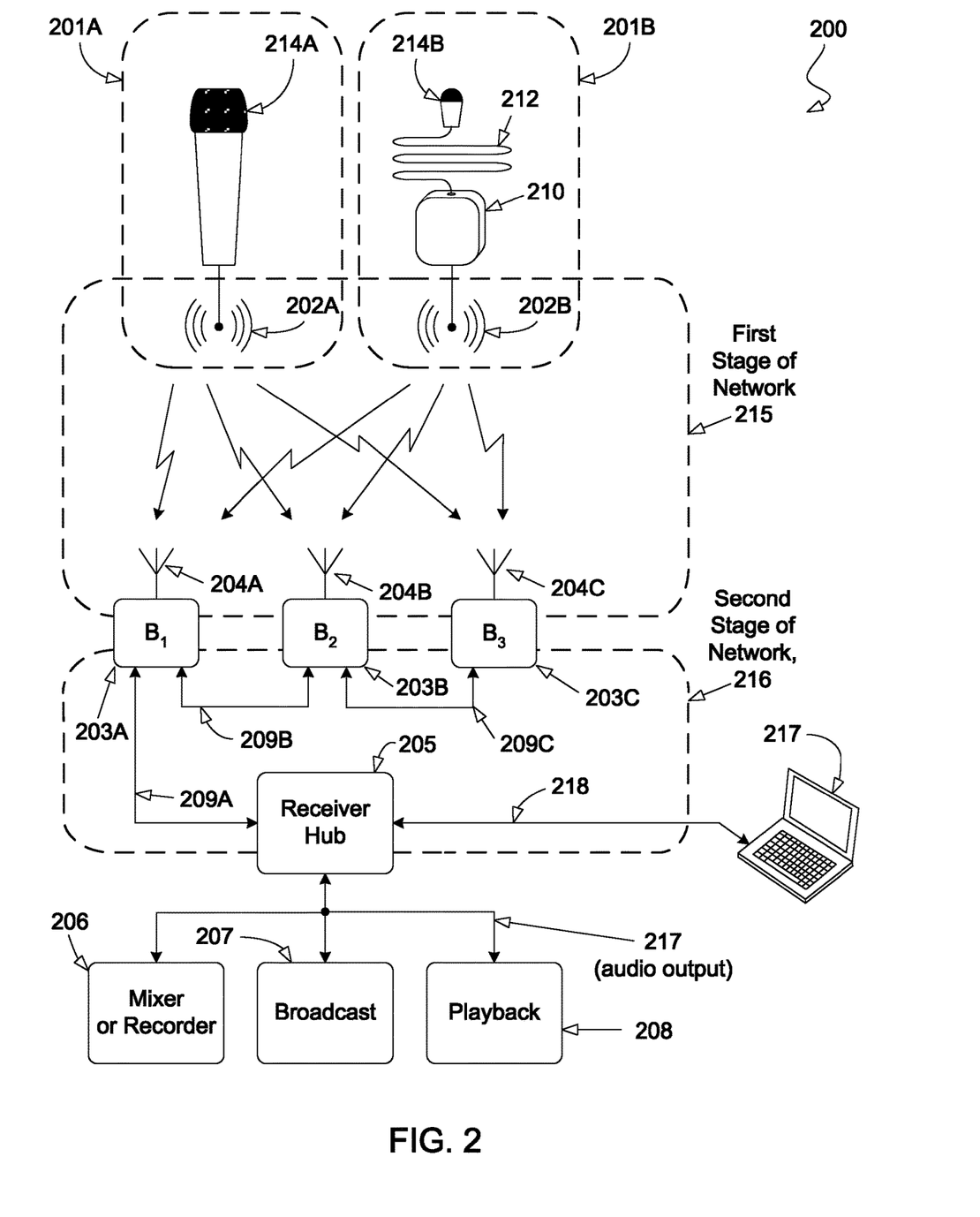
FIG. 2 is an example embodiment including two microphone modules where the secondary network is based on a serial topology.

FIG. 2 shows a system 200 constructed in accordance with another exemplary embodiment of the invention. In contrast to the system 100 of FIG. 1, the system of FIG. 2 illustrates the use of multiple microphone modules 201A and 201B connected to respective transmitters 202A and 202B for wirelessly communicating data to three wireless receivers 204A, 204B and 204C in base stations 203A, 203B and 203C respectively. In a similar manner to the system 100 in FIG. 1, the transmitters 202A and 202B that are electromagnetically coupled to receivers 104A, 104B and 104C may be construed as comprising the first stage 215 of a network.

In the second stage 216 of the network, each of the three base stations 203A, 203B and 203C may be serially linked (or "daisy chained"). In this topology, the third base station 203C is linked by communication link 209C to the second base station 203B, that is linked by communications link 209B to the first base station 203A, that is linked by communications link 209A to the receiver hub 205. With this topology, each base station in addition to receiving wireless audio data and forwarding (or broadcasting) this data the next base station or receiver hub 205 must also forward audio data received by it from the opposing base station toward the receiver hub 205.

In other embodiments, either two of more than three base stations may be serially connected from the receiver hub. In some embodiments, more than one daisy chain of serially connected base stations may emanate from the receiver hub 205. Alternative embodiments envisioned in the scope of this disclosure includes those where the network topology for the second stage 216 of the network may include any combination of communications links such that each base station has a pathway present whereby audio data received by it may broadcast such that it is forwarded along some path to the receiver hub 205. Again, the preferred means of providing communication links between base station and the receiving hub is Ethernet, while the preferred data format for broadcast is DANTE. With this design, an arbitrary number of base stations may be connected along each daisy chain emanating from the receiver hub 205.

Like in the system 100 of FIG. 1, each base station receives audio from microphone module 201A via its microphone transmitter 202A. However, each base station may also receive audio data from a second microphone module 201B via its microphone transmitter 202B. In other embodiments, more than two microphone modules may wirelessly transmit audio data to be received by the base station.

In cases where multiple microphone modules are wirelessly transmitting audio data to the base stations, each microphone module will need to be configured to transmit on its respective channel and each base station receive will need to be configured to receive wireless audio data on the corresponding channels. Furthermore, each microphone module need not be identical for the application of this invention. As can be seen from FIG. 2, one microphone module 201A is depicted as an integrated unit, while the other microphone module is depicted as being a lavalier type element 214 with a body pack transmitter 210 integrated with its microphone transmitter 202B. In some embodiments, base stations may even be configured to receive multiple wireless transmission formats from different types of microphone modules, including mixing analog and digital.

Since the base stations 103A, 103B and 103C are receiving multiple channels of wireless audio data, each channel of data is processed in the receiving base station separately with respect to its channel. Similarly to the single microphone module system 100, base stations in the multiple microphone module system 200 may each reformat the received data, preferably into a DANTE compatible protocol and broadcast this data through the second stage 216 of the network to the receiver hub 205. Upon receiving this data, the receiver hub 205 may then process each channel independently, generating an output data stream corresponding to each microphone module. The details for processing the received audio for each channel may be similar to that for the single microphone module case. Like in the system 100 of FIG. 1, the system 200 of FIG. 2 provides one or more of the reconstructed output or output data streams to an end-point that may include the use of a mixer/recorder 206, broadcast network 207 and/or playback devices 208.

The second stage 216 of the network may also be used for interfacing a user interface 217 for communicating command, control and configuration information to ether the receiver hub and/or base stations. This is particularly apparent when the second stage 216 of the network is based on and Ethernet connection. In these cases, the user interface 217, is preferably based on a computer and supporting software can serve as an interface to users for embedding command, control and configuration information into (or broadcasting this information to) any selected device connected to the second stage 216 of the network. In alternative embodiments, other forms of a user interface may suffice, and these may include the use of smart phones or other handheld computing devices. The second stage 216 of the network also provides a communication path for status information from either the receiver hub 205 or any base station to be sent back to the user interface 217.

If a sufficient computing power is present on the user interface 217, this unit may also assume the functions associated with the receiver hub 215, essentially merging the operation of the user interface 217 and receiver hub 205 into a single unit. The user interface may itself also contain large amount of disk storage and also assume the roll of an end-point for recording, playback and/or mixing and in some embodiments may itself aid in the broadcast of the output data stream to other end-points.

What is claimed is:

1. A method of connecting a wireless microphone to one or more endpoints comprising the steps of:
    providing at least one microphone module with a transmitting antenna and memory;
    providing an array of receiving base stations, wherein each base station has a receiving antenna, is configured to decode received audio data into audio over Ethernet data packets and to collect quality of signal information about the audio data in the respective audio over Ethernet data packets, is configured to augment the audio over Ethernet packets with said quality of signal information, and is further configured to transmit the augmented audio over Ethernet data packets through an Ethernet connection;
    providing a receiver hub configured to receive the audio over Ethernet data packets from each of the receiving base stations through an Ethernet connection;
    connecting the receiving base stations to the receiving hub using the Ethernet connections to form a second network stage;
    detecting a physical audio waveform with the microphone module;
    wirelessly transmitting audio data describing the audio waveform through the transmitting antenna of the at least one microphone over a first network stage to each receiving base station in the array within range;
    continuously receiving the wirelessly transmitted audio data in at least one of the receiving base stations within range of the transmitting antenna;
    in each of the receiving base stations in range, decoding the received audio data into audio over Ethernet data packets, collecting quality of signal information about the audio data and augmenting the respective audio over Ethernet data packets with said quality of signal information;
    transmitting the augmented audio over Ethernet data packets from the receiving base stations in range over the second stage of the network to be collected in the receiver hub;
    reconstructing an output audio waveform in the receiver hub from the collected audio data in the augmented audio over Ethernet data packets and based on the corresponding quality of signal information received from the receiving base stations in range; and
    sending or broadcasting the output audio waveform from the receiver hub to one or more endpoints.

2. The method according to claim 1, wherein the second stage of the network is based on Ethernet connections and uses one of the following audio over Ethernet protocols: DANTE, AES67 and RAVENNA.

3. The method according to claim 1, wherein the second stage of the network comprises a wireless connection and data sent over the second stage is organized into Ethernet frames.

4. The method according to claim 1, wherein the first stage of the network comprises at least one analog data connection.

5. The method according to claim 1, wherein the first stage of the network comprises digital data connections.

6. The method according to claim 5, wherein the microphone module compresses data to reduce the required data bandwidth of the first stage of the network.

7. The method of claim 1 wherein the microphone module is one of multiple microphone modules and the receiving base stations and receiver hub have multiple channels corresponding each to a respective microphone module.

8. The method of claim 1 wherein the output audio waveform is constructed on a basis of selecting audio segments corresponding to base stations wherefrom the lowest error rate occurs after applying error correction.

9. The method according to claim 1, wherein the quality of signal information comprises at least one of the number and location of transmission errors, wireless signal levels, noise levels, signal to noise ratio, and transmission error rate.

10. The method according to claim 1, wherein the microphone module stores audio data in a memory buffer and transmits audio data for one or more previous time periods having a delay of less than about 100 milliseconds when live audio data is transmitted; and further wherein retransmitted data is available for use when live data is detected as unreliable and the output audio waveform is suitable for live broadcast.

11. The method according to claim 1, wherein at times when data reception is deemed unreliable by a given base station, the base station mutes the corresponding audio data or sets it to values known to signify unreliable data, so that unreliable data is ensured to not be used by the receiver hub.

12. The method according to claim 1, wherein the receiver hub implements a packet-loss-concealment algorithm to synthesize missing portions of corrupt data when no valid data has been transmitted from any of the receiver base stations for a given time period and the output audio waveform is suitable for live broadcast.

13. The method according to claim 1, wherein the microphone module associates the audio data with a time stamp or a sequence identifier prior to wirelessly transmitting the live audio data.

14. The method according to claim 10, wherein the microphone module associates the audio data with a time stamp or a sequence identifier prior to wirelessly transmitting the live audio data, and further wherein retransmitted audio data is also associated with a respective time stamp or sequence identifier.

15. A method of connecting a wireless microphone to one or more endpoints comprising the steps of:
    providing at least one microphone module with a transmitting antenna and memory;
    providing an array of receiving base stations, wherein each base station has a receiving antenna, is configured to decode received audio data into audio over Ethernet data packets and is further configured to transmit the audio over Ethernet data packets through an Ethernet connection;
    providing a receiver hub configured to receive the audio over Ethernet data packets from each of the receiving base stations through an Ethernet connection;
    connecting the receiving base stations to the receiving hub using the Ethernet connections to form a second network stage;
    detecting a physical audio waveform with the microphone module, storing audio data in a memory buffer;
    wirelessly transmitting audio data describing the audio waveform through the transmitting antenna of the microphone module over a first network stage to each receiving base station within range, wherein the microphone module transmits audio data for one or more previous time periods when live audio data is wirelessly transmitted, and further wherein the retransmitted data is available for use by the system when live data is detected as unreliable;

receiving the wirelessly transmitted audio data in the receiving base stations within range of the transmitting antenna;

in each of the receiving base stations in range, decoding the received audio data into audio over Ethernet data packets;

transmitting the audio over Ethernet data packets from the receiving base stations in range over the second stage of the network to be collected in the receiver hub;

reconstructing an output audio waveform in the receiver hub from the collected audio data in the audio over Ethernet data packets; and sending or broadcasting the output audio waveform from the receiver hub to one or more endpoints.

16. The method according to claim 15, wherein the microphone module associates the audio data with a time stamp or a sequence identifier prior to wirelessly transmitting the live audio data, and further wherein retransmitted audio data is also associated with a respective time stamp or sequence identifier.

17. The method according to claim 15, wherein the retransmitted audio data has a delay of less than about 100 milliseconds.

18. The method according to claim 15, wherein the retransmitted audio data has a delay of less than about 30 milliseconds.

19. A method of connecting a wireless microphone to one or more endpoints comprising the steps of:

providing at least one microphone module with a transmitting antenna;

providing an array of receiving base stations, wherein each base station has a receiving antenna, is configured to decode received audio data into audio over Ethernet data packets and is further configured to transmit the audio over Ethernet data packets through an Ethernet connection;

providing a receiver hub configured to receive the audio over Ethernet data packets from each of the receiving base stations through an Ethernet connection;

connecting the receiving base stations to the receiving hub using the Ethernet connections to form a second network stage;

detecting a physical audio waveform with the microphone module, storing audio data in a memory buffer;

wirelessly transmitting audio data describing the audio waveform through the transmitting antenna of the microphone module over a first network stage to each receiving base station within range;

receiving the wirelessly transmitted audio data in the receiving base stations within range of the transmitting antenna;

in each of the receiving base stations in range, decoding the received audio data into audio over Ethernet data packets;

transmitting the audio over Ethernet data packets from the receiving base stations in range over the second stage of the network to be collected in the receiver hub;

reconstructing an output audio waveform in the receiver hub from the collected audio data in the audio over Ethernet data packets, unless no valid data has been transmitted from any of the receiver base stations for a given time period in which case the receiver hub implements a packet-loss-concealment algorithm to synthesize missing portions of corrupt data; and sending or broadcasting the output audio waveform from the receiver hub to one or more endpoints.

20. The method according to claim 19, wherein the given time period is less than about 30 milliseconds and the output audio waveform is suitable for live broadcast.

* * * * *